Patented Oct. 18, 1932

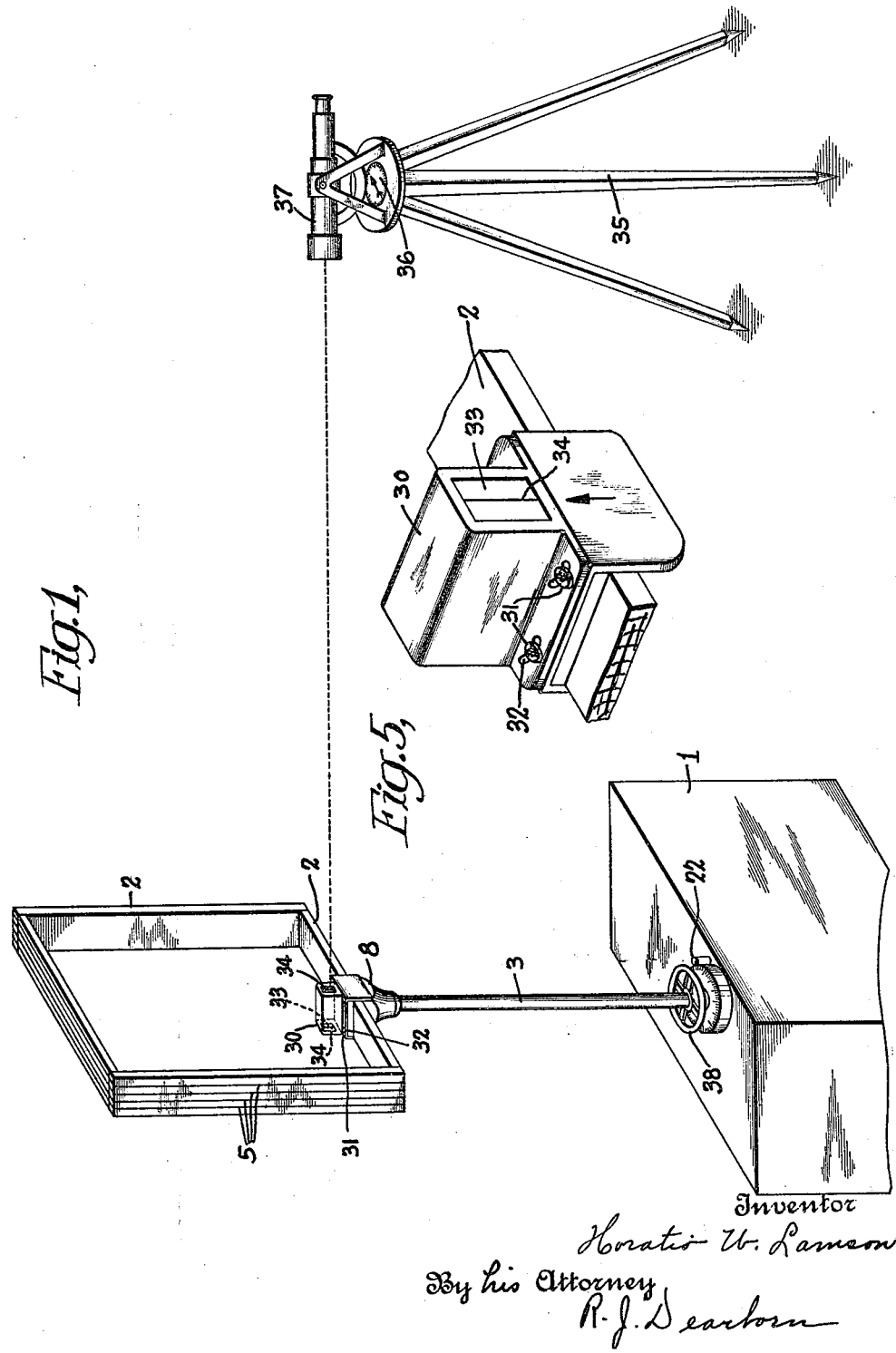

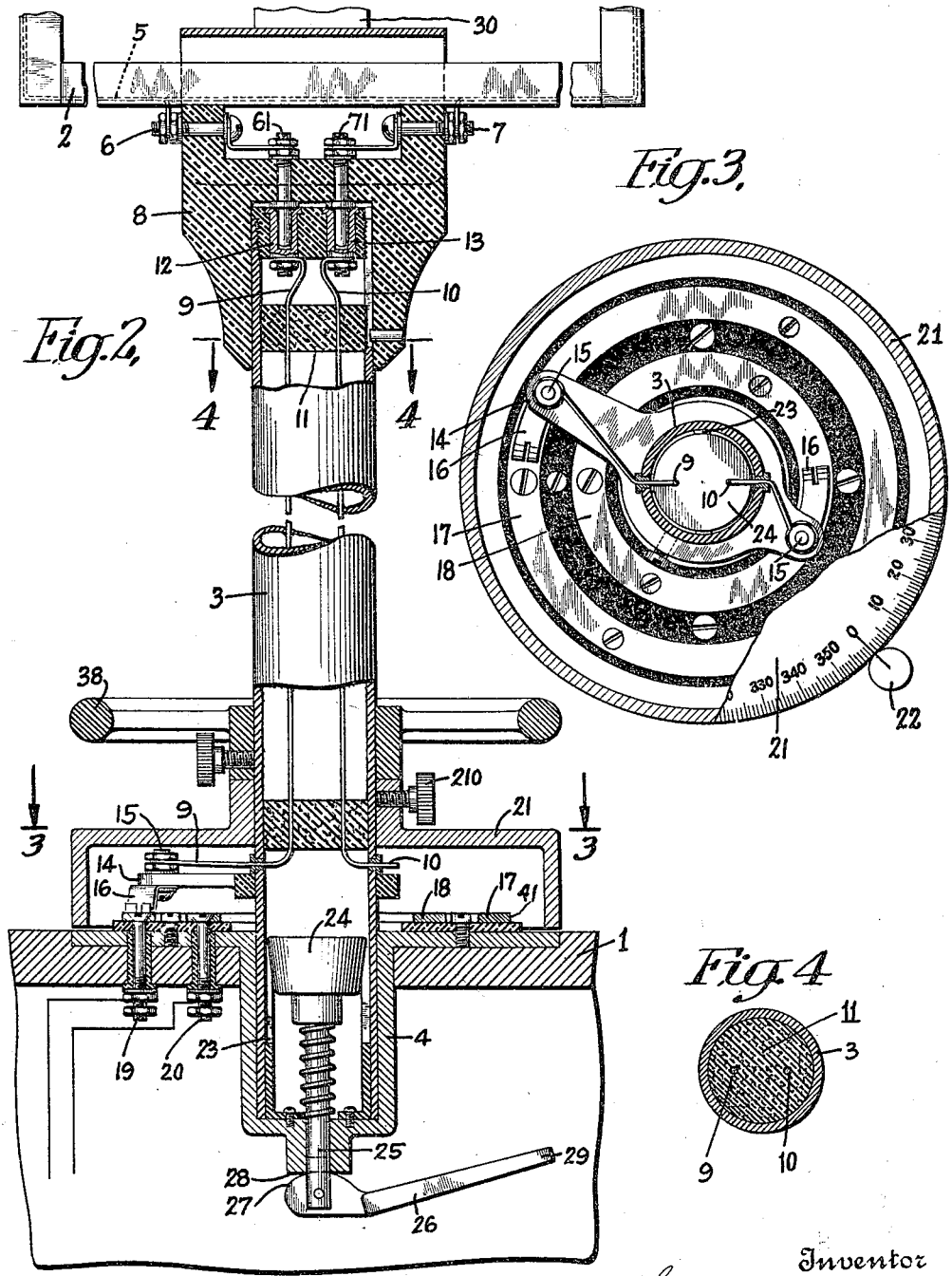

1,883,802

UNITED STATES PATENT OFFICE

HORATIO W. LAMSON, OF ARLINGTON, MASSACHUSETTS, ASSIGNOR TO THE TEXAS COMPANY, OF NEW YORK, N. Y., A CORPORATION OF DELAWARE

RADIOCOMPASS

Application filed January 24, 1928. Serial No. 249,095.

The invention relates primarily to a device for determining the direction of a source from which radio or similar waves emanate so that the relative location of various selected points may be readily determined.

A primary feature of the invention is the portability of the device of this character which it contemplates. Another feature is the provision of effective means for allocating the bearings with respect to true magnetic north.

In certain types of surveying where the distances between certain selected points are desired, as well as their location relative to known land-marks or monuments, these may be determined expeditiously by means of the present invention. For example, by the use of the present improvements radio compass bearings may be taken between a number of points and if the precise distance between any two of the points is determined in any suitable way as by actual measurement, the remaining distances may be calculated or otherwise determined by the usual methods of triangulation. If it should then be desired to allocate the points on which the bearings have been taken with respect to magnetic north so that their positions may be charted, it will only be necessary to correct the radio compass bearing readings in accordance with the reading of a magnetic compass at one or more of the points. It has been found desirable for this purpose to employ a separate transit including the usual telescope and a magnetic needle in place of providing a magnetic compass directly on the loop or other portion of the radio compass. This not only lends a greater portability to the apparatus but avoids the disturbing influences of the radio devices over the magnetic compass and makes the transit available for other purposes, tending toward greater accuracy in the results. By the adoption of a known land-mark as one of the points on which the bearings are taken, the precise location of all of the points may be fixed on a map if desired.

As will become more apparent from the detailed description which will follow, the apparatus contemplated may be set up at random at any points desired without any particular accuracy or delicacy in the method of setting it up or the position which it assumes with relation to other objects.

In general, the radio compass comprises a sensitive radio receiving set and a loop antenna so mounted on the set as to be adjustable to any direction about a vertical axis. Among the specific improved features of the device may be mentioned the construction of the loop and the means for detachably mounting it on the radio receiving set as well as the form of electrical connection between the loop and set which readily permits the adjustment and detachment of the loop. An improved arrangement and mode of mounting a scale calibrated in degrees for determining the position of the loop is also a feature of the invention, and this enables the direct determination of the true magnetic bearing. The invention further contemplates the complete shielding of all of the circuits except the portion formed by the loop.

With the foregoing and other incidental advantages and desirable characteristics in view, the invention will now be described in detail with reference to the accompanying drawings in which—

Figure 1 is a perspective view of the compass and transit showing their relative location in use.

Figure 2 is a detailed view, mostly in section, illustrating the form of connection between the receiving unit of the compass and the loop.

Figure 3 is a cross sectional view taken along the line 3—3 of Figure 2 and having the scale disc mostly broken away to disclose parts normally concealed.

Figure 4 is a cross sectional view taken along the line 4—4 of Figure 2.

Figure 5 is a detail, perspective view of a portion of the loop.

Referring now to Figure 1, it will be seen that the radio compass comprises in general three essential elements. A radio receiving set 1, of any suitable construction, is provided for the purpose of amplifying and producing an audible signal in response to the radio waves picked up by the loop 2 of the compass. A tubular connector 3, preferably of metal, is provided between the receiving set and the loop 2 and is so constructed as to permit the free turning of the loop relative to the set, while maintaining a direct electrical connection in a way to be described between the set and the loop. At its lower end the connector 3 is adapted to fit into a socket 4 secured in any suitable way to the top of the casing which encloses the receiving set 1. Socket 4 may be formed in any suitable way, but is preferably a casting of sufficient dimension to lend proper support to the loop 2 and connector 3. Around the outside of the wooden frame of loop 2 there are wound a few turns of a wire 5 which may be of any suitable size. The ends of this wire are connected respectively to binding posts 6 and 7 which are in turn connected to contact elements 61 and 71 mounted within a socket 8, formed preferably of wood or similar insulating material, and secured to the loop frame at the midpoint of its lower side. This socket is adapted to fit over the upper end of the connector 3 and is keyed to the latter as by means of the pin and slot shown in Figure 2 to prevent relative turning between the frame and the connector. If desired, a set screw may also be provided to form a more rigid connection at this point.

Extending throughout the length of the tubular connector 3 there is provided a pair of wires 9 and 10 of any suitable gauge and any material, such as copper, which is a good conductor of electricity. These wires are held in spaced relation within the tube 3 and are insulated from the latter, preferably by means of circular blocks or washers 11 of suitable insulating material mounted, as shown, in the tube. At their upper ends the wires 9 and 10 are connected respectively to contact elements or sockets 12 and 13 which, when the socket 8 of the loop 2 is fitted over the upper end of the tube 3, serve to make electrical connection with the elements 61 and 71 mounted within the socket 8. At their lower ends the wires 9 and 10 pass through openings in the tube 3, suitable means being provided for insulating the wires from the tube at this point. The ends of the wires are then connected respectively to binding posts 15 carried by a two-armed member 14 secured to the tubular connector 3. This member may be formed of any suitable non-conducting material, or if it is made of metal, the binding posts will be insulated therefrom. A pair of brushes 16 is carried by the member 14 and each is connected electrically to a respective one of the wires 9 and 10 by means of the binding posts 15. The mounting of the brushes 16 is such that one is at a greater radial distance from the center of the tube 3 than the other. On the upper surface of the flange of the socket 4, there is located a pair of commutator rings 17 and 18 which are spaced from each other and insulated from the member 4 by means of an annular insulating washer 41. The arrangement of these rings and the arms 14 and 15 is such that when the tube 3 is inserted in the socket or bearing member 4, the brushes 16 will make electrical contact with the two commutator rings.

It will be clear that by this construction no matter what angular position the tube 3 may assume with respect to the receiving set 1, a circuit will be maintained from the ring 17 through the wire 9, around the wire 5, on the outside of the loop frame and down through the wire 10 to the other commutator ring 18. Electrical conductors leading from binding posts 19 and 20 connected at any suitable points to the two commutator rings may then be employed for carrying this circuit to any suitable arrangement of coils, condensers, etc. within the receiving set 1.

A flanged disc 21, preferably of metal, and having a hub is fitted over the tube 3 in such a way as to conceal the brushes and commutator rings at the lower end of the tube. The upper surface of this disc may then be provided with a scale marked in degrees from zero to 360. One or more set-screws 210 having knurled heads made be passed through the hub of the disc for securing the latter to the tube 3 so that these elements will be rotated in unison. The set-screws provide a convenient means for permitting the adjustment of the disc relative to the tube for the purpose of calibrating the position of the loop with respect to true magnetic north.

For convenience in reading the scale on the disc, a suitable fixed marker 22 may be provided, as for example on the upper end of a post secured to the casing of the set 1 adjacent to the disc.

Means are provided for clamping the tube 3 and thereby maintaining the loop 2 in a definite position at a time when the disc 21 is being adjusted relative to the tube. For this purpose there is secured to the socket 4, and within the recess of the latter, a shell 23 having its upper open end split at a number of points to form a series of resilient fingers and this shell, when the tube is inserted in the socket, fits within the lower end of the tube. A tapered block or member 24 is fitted into the upper end of the collar 23 and when drawn downwardly (Figure 2) will serve to spread the free ends or fingers of the shell until the latter grip the inside of the tube 3. The friction thus generated between the split shell and the tube is sufficient to prevent turning of the tube relative to the set 1 by the application of any ordinary amount of power. For the purpose of drawing the tapered member 24 downwardly, a rod 25 is connected to the lower side of the latter and at its lower end is connected to an arm 26. This arm is provided with a cam face 27 which co-operates with a flat face 28 formed on the under side of the socket 4. The arrangement is such that when the arm 26 is turned on its pivot by depressing the handle 29, the rod 25 and cone 24 will be drawn downwardly to spread the split end of the collar 23. Access to the arm 26 may be had through a suitable door or lid formed on the cabinet.

On the frame of the loop 2 just above the socket 8 there is provided a housing 30 which is adjustably mounted with respect to the loop. For this purpose any suitable means may be provided for securing the housing to the loop, such as clamping screws or bolts 31 extending through elongated arcuate slots 32, in flanges formed on both sides of the housing, and passing into the frame of the loop. For greatest accuracy in the results, the adjustment of the housing should be about a vertical axis directly through its center so that the base plate of the latter is preferably provided with a central pivot pin adapted to enter the supporting frame.

At the front and the rear of the housing 30 there are provided pieces of transparent material, such as glass, 33, which at their centers carry vertical hair-lines 34. These hair-lines are so arranged that when the loop is properly adjusted in accordance with its minimum effectiveness an accurate sight may be taken to determine the direction of a source of radio impulses.

It has been found from experience that the minimum reception of radio waves by means of a loop such as the one disclosed does not take place when the latter is located in a plane precisely perpendicular to the line from the source of the waves. On the other hand, a slight angle of correction must be noted, depending upon the inherent characterstics of the particular loop. When this angle of correction is once determined, it remains constant for all future determinations, i. e., when the loop is turned until a minimum reception is had from any source, the source will be known to be located on a line which varies from one perpendicular to the plane of the loop, by this constant factor of correction.

The adjustability of the housing 30 with respect to the loop frame 2 provides suitable means for permanently applying the correction factor. Thus when the loop is calibrated, the two hair-lines 34 will not form a sight exactly perpendicular to the plane of the loop, but will vary from such line by the value of the angle of correction. An arrow or other similar designation should be provided on one side of the loop or the housing 30 to indicate which side of the loop should be faced toward the source of waves. Otherwise the angle of offset of the housing would be in the wrong direction and would tend to double the error.

In the actual use of the compass in the field, a suitable form of transit will usually be employed as shown in Figure 1, although this is essential only when the true magnetic bearings of the various points of interest are to be determined. The transit may comprise any suitable form of stand 35 which may be adjusted to any desired height and on which there is mounted a magnetic compass 36 and a telescope 37.

For the purpose of illustrating the use of the apparatus, let it be asumed that the compass receiver 1 is placed at any point from which the bearing toward a source of radio waves is desired. No attention need be paid to the relative position assumed by the set 1 on the ground, although after it is once located its position should not be disturbed. The transit is then set up at any convenient point at a distance of, say, ten feet from the radio compass and a sight is taken by means of the telescope 37 upon the hair-lines 34 on the loop of the compass. For this purpose, two operators will normally be required, one serving to adjust the loop 2 while the other acts as an observer to indicate when the hair-lines 34 are brought into line with a similar hair-line in the telescope 37. When the proper adjustment has been effected, the lever 29 should be swung downwardly so that the split shell 23 clamps the tube 3 and prevents turning of the loop. The set screws which normally hold the disc 21 are then loosened to permit adjustment of the latter relative to the tube 3. This disc is turned until the scale reading with respect to the fixed arrow 22 coincides with the reading of the needle of the compass 36 with respect to a scale that is movable with the telescope 37. The set-screws are then turned to secure the disc 21 to the tube 3 and the lever 29 may be swung upwardly to release the tube for turning.

It will be apparent that in any subsequent adjustment of the loop 2, the scale on the disc 21 will provide a reading corresponding directly to the bearing of the hair-lines 34 relative to true magnetic north.

Now, if the loop 2 is turned in any suitable way, as by means of a hand-wheel 38, until a minimum effect is produced in the ear phones connected to the receiving set 1, the direction of the source of the radio waves may be determined and the bearing relative to magnetic north will correspond to the reading on the scale 21. It will be understood that in determining the position of minimum effect, the loop will be oscillated back and forth through a constantly decreasing arc until the precise minimum is reached.

It will be apparent that many modifications may be made in the apparatus and procedure outlined in the foregoing sections. Reference has been made to the desirability of forming the connector 3 and the flanged disc 21 of metal. It is also desirable to form the entire enclosing cabinet for the set 1 of metal and to provide constant electrical conductivity between the connector, the disc and the casing. This system should also be grounded to some suitable point in the circuits of the radio receiver 1. A construction of this character will serve to effectively shield all of the radio circuits with the exception of the wire 5 on the loop which must be free to pick up the desired waves. Certain disturbing influences which are variable and difficult to determine are in this way eliminated and greater accuracy in the results obtainable is made possible. It should be understood that the invention is to be regarded as limited only by the scope of the claims which follow.

What I claim is:

1. In a device of the class described a radio receiving set, a loop, an elongated connector between said set and said loop for supporting the latter, said connector being separable from both said set and loop, means carried by said connector for establishing electrical connection between said loop and set, relatively movable means carried by said set and said connector whereby the relative position of the set and loop may be indicated, a portion of said movable means being adjustable relative to its carrier, a resilient sleeve mounted concentrically of said connector, and a tapered member adapted to cooperate with said sleeve and said connector to hold said connector in fixed relation to said set, while said portion of said movable means is being adjusted.

2. In a device of the class described a radio receiving set, a loop, an elongated connector between said set and said loop for supporting the latter, said connector being separable from both said set and loop, means carried by said connector for establishing electrical connection between said loop and set, a pair of co-operating elements carried respectively by said connector and said set to indicate the relative position thereof, one of said elements being adjustable on said connector, and means for clamping said connector to said set while said element is being adjusted.

3. In a device of the class described a radio receiving set, a loop antenna, an elongated tubular connector, means for so mounting said connector on said set as to permit relative angular movement thereof, means for so mounting said loop on said connector as to prevent relative angular movement thereof, an angular scale, an index, said scale being carried by said connector and said index by said set for indicating the relative angular position of said loop and set, said scale being adjustably mounted on said connector and means comprising a tapered member and a cooperating resilient sleeve mounted within said connector for holding said connector in fixed relation to said set while said scale is being adjusted.

4. In a device of the character described, a radio receiving set, a loop, an elongated connector between said set and said loop for supporting the latter, relatively movable elements carried by said set and said connector whereby the relative position of said set and loop may be indicated, one of said elements being adjustable relative to its carrier, means for holding said connector in fixed relation to said set while said element is being adjusted, said holding means comprising a resilient member in close proximity to said connector, and means for forcing said member against said connector to prevent relative movement between said connector and said member.

In witness whereof I have hereunto set my hand this 14th day of January, 1928.

HORATIO W. LAMSON.